United States Patent [19]

Surprenant

[11] 4,384,028

[45] May 17, 1983

[54] LIQUID CATHODE ELECTROCHEMICAL CELL ADDITIVES

[76] Inventor: Joseph Surprenant, 870 Dartshire Way, Sunnyvale, Calif. 94087

[21] Appl. No.: 290,658

[22] Filed: Aug. 6, 1981

[51] Int. Cl.$^3$ .............................................. H01M 6/14
[52] U.S. Cl. ..................................... 429/105; 429/196
[58] Field of Search ................ 429/101, 105, 196, 194

[56] References Cited

U.S. PATENT DOCUMENTS

| | | | |
|---|---|---|---|
| 4,167,608 | 9/1979 | Giattino | 429/196 |
| 4,264,687 | 4/1981 | Dey et al. | 429/101 |
| 4,272,593 | 6/1981 | Klinedinst | 429/196 X |

*Primary Examiner*—Charles F. LeFevour

[57] ABSTRACT

The energy density as shown by improved cell life of power cells having consummable alkaline or alkaline earth anodes such as lithium, a carbonaceous current collector and a liquid active cathode depolarizer is enhanced by adding to said current collector one or more of the following: platinum, titanium, niobium, tantalum, antimony, vanadium, indium, tin, nickel, gold, zinc, tungsten, molybdenum, silver, paladium, manganese, colbalt, yttrium, and cadmium.

5 Claims, No Drawings

LIQUID CATHODE ELECTROCHEMICAL CELL ADDITIVES

This invention relates to electrochemical cells and batteries. More particularly, it relates to cells having an oxidizable anode material, a liquid active cathode material and a solid current collector.

In recognition of the serious deficiencies in the commercially available electrochemical power sources, much attention has recently been focused on the development of a new class of batteries consisting of an oxidizable anode material, a liquid active cathode material and a solid current collector.

The use of a liquid as an active cathode depolarizer is a departure from conventional cell technology. Until recently, it was generally believed that the active cathode depolarizer could not directly contact the anode. However, it has recently been discovered that certain active cathode materials do not react chemically to any appreciable extent with an active anode metal at the interface between the metal and the cathode material, thereby allowing the cathode material to contact the anode directly.

Early liquid cathode cells used liquid sulfur dioxide as the active cathode depolarizer as described in U.S. Pat. No. 3,567,515 issued to Maricle, et al. on Mar. 2, 1971. Since sulfur dioxide is not a liquid at room temperature and at atmospheric pressure, it proved to be quite a difficult chemistry with which to work. More importantly, sulfur dioxide cells are unsafe for most consumer applications due to their propensity to explore under certain circumstances.

A major step forward in the development of liquid cathode cells was the discovery of a class of inorganic materials, generally called oxyhalides, that are liquids at room temperature and also perform the function of being the active cathode depolarizer. Additionally, these materials may also be used as the electrolyte solvent. Liquid cathode cells using oxyhalides are described in U.S. Pat. No. 3,926,669 issued to Auborn on Dec. 16, 1975, and in British Pat. No. 1,409,307 issued to Blomgren et al. on Oct. 18, 1975. At least one of the oxyhalides, thionyl chloride ($SOCl_2$), in addition to having the general characteristics described above, also provides substantial additional energy density.

Among the liquid cathode type cells, those having lithium or lithium alloy anodes and thionyl chlorides as the liquid cathode are believed to be the most advantageous. In lithium thionyl chloride cells, the thionyl chloride performs the dual role of liquid cathode and electrolyte solvent. The electrolyte solute is typically lithium tetrachloroaluminate.

In addition to an anode and liquid cathode, these cells require current collector. This component is a solid, substantially nonconsummable material mechanically spaced from the anode by an electrolyte-permeable separator material. Functionally, the current collector provides a catalytic surface upon which the thionyl chloride is reduced during cell discharge.

According to British Pat. No. 1,409,307 issued to Blomgren, any compatible solid, which is substantially electrically conductive and inert in the cell, such as graphite, will be useful as a current collector since the function of the collector is to permit external electrical contact to be made with the active cathode material. It is desirable to have as much surface contact as possible between the liquid cathode and the current collector. Therefore, a porous material is preferred since it will provide a high surface area interface with the liquid cathode material. The current collector may be metallic and may be present in any physical form such as metallic film, screen or a pressed powder. Examples of some suitable metal current collectors are provided in Table II of U.S. Pat. No. 3,926,669 to Auborn. The current collector may also be made partly or completely of carbon.

According to U.S. Pat. No. 4,167,608 to Giattino, carbon current collectors containing dispersed copper particles improve the performance and safety characteristics of a lithium thionyl chloride cell. The improvement is hypothesized as possibly due in part to the catalytic effect of copper on certain cell reactions and in part to a possible reaction of copper with elemental sulfur, a cell reaction product.

However, catalytic activity for any metal catalyst is strictly dependent on such parameters as surface area, particle size, pore size distribution, electrical conductivity, chemical state and the type and quantity of impurities present. Furthermore, since the theory explaining the role of particulate copper in the cell is not precisely known, it cannot be predicted whether other metal additives would result in any improved cell characteristics.

The present invention is based on the discovery that an improved lithium anode, thionyl chloride active cathode depolarizer cell can be made by adding various transition metals to the current collector.

It is another object to provide a lithium/thionyl chloride cell having better storage characteristics than those reported in the art which contain a carbon current collector.

The basis of the present invention is the discovery that the energy density as shown by improved cell life of cells having a lithium anode, thionyl chloride liquid cathode and a carbonaceous current collector is improved by adding to the current collector one or more of the following metals: platinum, titanium, niobium, tantalum, antimony, vanadium, tin, nickel, gold, tungsten, molybdenum, palladium, manganese, cobalt, cadmium, zinc, indium and yttrium.

These and other objects of the invention may be achieved by an electrochemical cell comprising an alkali metal anode, a current collector spaced from said anode and comprising a porous body of carbon and one or more of the aforementioned transition metals, and an electrolyte solution in chemical and electrical contact with both the current collector and anode, said electrolyte solution comprising an ionically conductive solute dissolved in an active cathode depolarizer selected from the group consisting of one or more of the following: phosphoryl chloride, sulfuryl chloride and thionyl chloride.

In a liquid cathode electrochemical cell made in accordance with the present invention the anode preferably is lithium metal or alloys of lithium and the electrolyte solution is an ionically conductive solute dissolved in a solvent that is also an active cathode depolarizer.

The solute may be a simple or double salt which will produce an ionically conductive solution when dissolved in the solvent. Preferred solutes are complexes of inorganic or organic Lewis acids and inorganic ionizable salts. The requirements for utility are that the salt, whether simple or complex, be compatible with the solvent being employed and that it yield a solution which is ionically conductive. According to the Lewis or electronic concept of acids and bases, many substances which contain no active hydrogen can act as acids or acceptors or electron doublets. In U.S. Pat. No. 3,542,602 it is suggested that the complex or double salt formed between a Lewis acid and an ionizable salt yields an entity which is more stable that either of the components alone.

Typical Lewis acids suitable for use in the present invention include aluminum chloride, antimony pentachloride, zirconium tetrachloride, phosphorus pentachloride, boron fluoride, boron chloride and boron bromide.

Ionizable salts useful in combination with the Lewis acids include lithium fluoride, lithium chloride, lithium bromide, lithium sulfide, sodium fluoride, sodium chloride, sodium bromide, potassium fluoride, potassium chloride and potassium bromide.

The double salts formed by a Lewis acid and an inorganic ionizable salt may be used as such or the individual components may be added to the solvent separately to form the salt. In accordance with the invention, the preferred double salt is that formed by the combination of aluminum chloride and lithium chloride to yield lithium aluminum tetrachloride.

In addition to an anode, active cathode depolarizer and ionically conductive electrolyte, these cells require a current collector. According to the instant invention, the current collector is acetylene black into which is blended small particles of one or more of the following metals: platinum, titanium, niobium, tantalum, antimony, vanadium, indium, tin, nickel, gold, zinc, tungsten, molybdenum, silver, paladium, manganese, cobalt, cadmium, and yttrium. Percentages of from 1 to 25 by weight of metal to carbon are useful.

Electrical separation of current collector and anode is required to insure that cathode or anode reactions do not occur unless electrical current flows through an external circuit. Since the current collector is insoluble in the electrolyte and the anode does not react spontaneously with the electrolyte, a mechanical separator may be used. The preferred materials useful for this function are either a porous glass or ceramic.

Test results showing the effect of various metals on energy density and internal impedance as evidenced by cell life are provided in Table I. This data is given by way of examples to enable those persons skilled in the art to more clearly understand and practice the invention. They are intended to be illustrative and representative but not limiting the scope of the invention.

Nineteen metal powders were obtained from various manufacturers in the finest mesh readily available. These materials were chosen as representative of potentially catalytic, non-alkaline earth metals. Rough approximations of surface area were made by comparing mesh sizes and densities as a starting point for relating performance to physical characteristics. In each case, the metal powder was added to a prescribed amount of carbon to form cathodes for 0.88" cells. All test cells and controls were simultaneously filled with electrolyte by the technique of evacuation and backfilling. Thirty each of the experimental and ten each of the control cells were filled for each metal powder tested. These cells were stored in a 50° C. oven for periodic testing. Five experimental and two control cells were extracted from the oven and discharged under constant load of 365 ohms (4.3 mA/cm$^2$) to a 2.4 volt cutoff after storage periods of 1, 7, 14, 21, 28 and 35 days. The number of control cells tested at any one time was actually six since three sets of experimental and control cells were filled at one time and then discharged simultaneously.

Each of the entries in Table I represents a test cell having a nominal internal volume of 0.035 cu inches constructed in a typical button configuration with single disc shaped current collector, anode and separator. The electrolyte was a 1.5 molar solution of lithium aluminum tetrachloride in thionyl chloride. The anode was a 0.680 inch diameter disc of 0.024 inch thick lithium. The separator was a commercially available ceramic paper. The current collector comprised a metal and acetylene black. Particulate metal was dispersed in the acetylene black which was then compacted into a pellet. The only variable in the cell was the weight and type of metal added to acetylene black.

The reference cell contained a carbon current collector. The dashed entries indicate no test.

TABLE I

| Additive | mg. | Life in MAh after Storage at 50° for | | | | | |
|---|---|---|---|---|---|---|---|
| | | 1 Day | 7 Days | 14 Days | 21 Days | 28 Days | 35 Days |
| Reference | — | 190 | 180 | 163 | 140 | 135 | 131 |
| Platinum black | — | 166 | 174 | 170 | 139 | 30 | — |
| Antimony | 19 | 177 | 176 | 150 | — | 165 | 123 |
| Titanium | 13 | 104 | 66 | 37 | 189 | 0 | — |
| Vanadium | 26 | 180 | 154 | 151 | 193 | 45 | 40 |
| Indium | 21 | 182 | 170 | 104 | — | — | — |
| Tin | 9 | 220 | 132 | 130 | 100 | 125 | 80 |
| Nickel | 13 | 210 | 162 | 158 | 156 | — | 145 |
| Gold | 56 | 210 | 165 | — | 68 | 50 | — |
| Zinc | 21 | — | 130 | — | — | — | — |
| Tungsten | 56 | — | 150 | 183 | 148 | 150 | — |
| Molybdenum | 29 | 172 | 138 | 135 | 130 | 130 | 145 |
| Silver | 13 | 200 | 121 | 134 | 0 | — | 80 |
| Niobium | 25 | 164 | 200 | 165 | 147 | — | 148 |
| Palladium | 35 | 200 | 200 | 190 | 148 | — | — |
| Manganese | 10 | 193 | — | 138 | 144 | 141 | 157 |
| Cobalt | 13 | 203 | 150 | 140 | 136 | 130 | — |
| Yttrium | 12 | 174 | 165 | 140 | — | — | — |
| Cadmium | 25 | 200 | 130 | 120 | 120 | 10 | — |
| Tantalum | 13 | 180 | 138 | 165 | 162 | 156 | 174 |

All additives are expressed above as mg. added per 104 mg. carbon. (No entry for MAh indicates "no test").

The above data on Table I indicate that, at various weights, metals added to the current collector exhibit improved cell life over the reference cell after storage at 50° C. Improved cell life may occur after different storage periods, therefore it is possible to select the type and quantity of metal additive to design cells having preselected storage characteristics.

In particular, the cells containing manganese, molybdenum, nickel, niobium and tantalum exhibited improved cell life over the reference cell after 35 days storage at 50° C.

What is claimed is:

1. An electrochemical cell comprising:
   an anode;
   a liquid cathode including an ionically conducting solute;
   a solid, nonconsummable current collector consisting essentially of carbon and at least one metal selected from the group consisting of antimony, cobalt, cadmium, gold, indium, manganese, molybdenum, nickel, niobium, palladium, platinum, silver, tantalum, titanium, tin, tungsten, vanadium, yttrium, and zinc;
   and a separator mechanically separating said anode from said current collector.

2. A cell according to claim 1 wherein said anode is lithium and said liquid cathode is thionyl chloride.

3. A cell according to claim 2 wherein said current collector contains from 1 to 25 percent by weight of said metal.

4. A cell according to claim 3 wherein said metal is selected from the group consisting of manganese, molybdenum, nickel, niobium and tantalum.

5. A cell according to claim 4 wherein said ionically conducting solute is lithium aluminum tetrachloride.

* * * * *